June 6, 1950  S. M. SMITH  2,510,721
BIRDHOUSE
Filed May 22, 1945
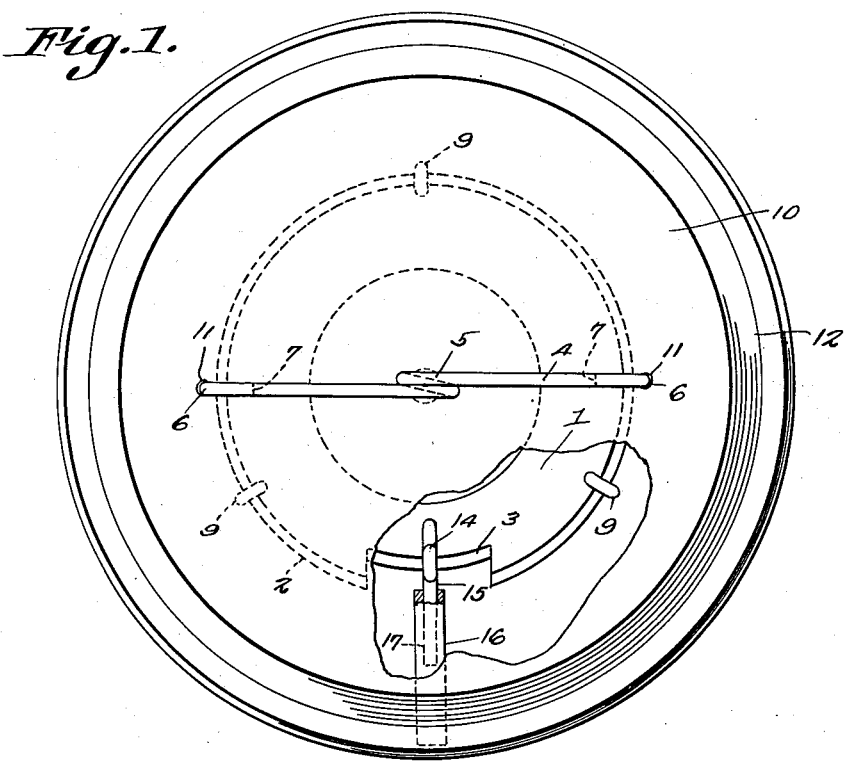
Fig. 1.
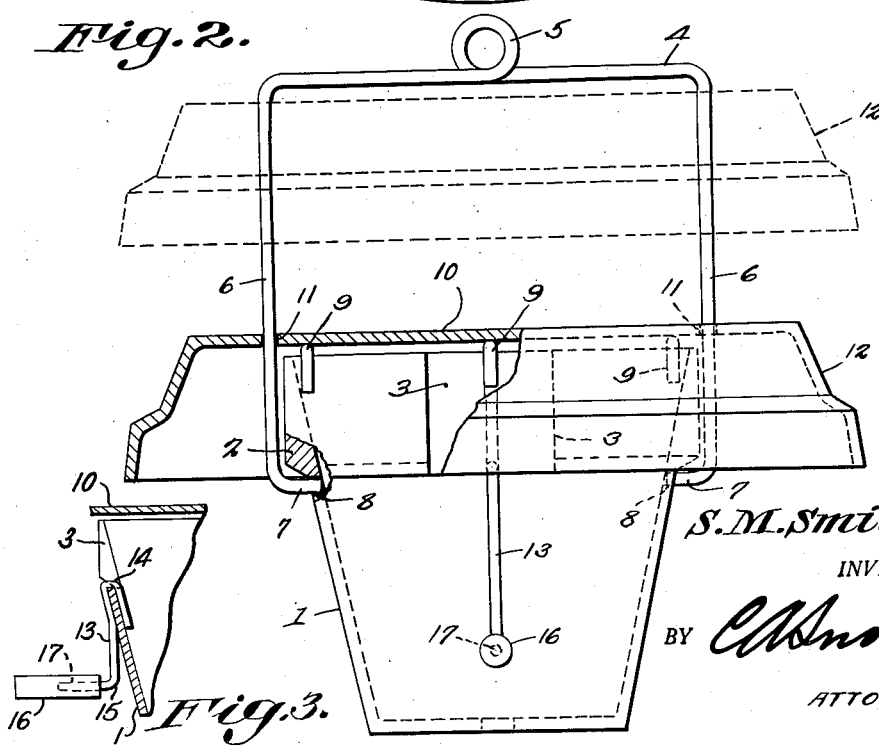
Fig. 2.
Fig. 3.
S. M. Smith
INVENTOR.
BY *C. A. Knowles*
ATTORNEYS.

Patented June 6, 1950

2,510,721

UNITED STATES PATENT OFFICE 2,510,721

BIRDHOUSE

Samuel M. Smith, New Bedford, Mass.

Application May 22, 1945, Serial No. 595,124

2 Claims. (Cl. 119—23)

This invention relates to a bird house, one of the objects being to provide a structure which, while primarily formed of pottery, can also be made of plastic or any other material meeting the requirements.

An object of the invention is to provide a bird house which is thoroughly ventilated at all times, can be easily cleaned, and affords excellent protection for the birds.

It is another object to provide a bird house the interior shape of which is such as to lend itself properly to the formation of a nest.

A still further object is to provide a bird house which is ventilated and because of its construction and the material of which it is made maintains the interior cool during warm weather and comparatively warm during the winter months.

A still further object is to provide a bird house which, while formed mainly of molded ceramic material, has associated with it a metal hanger which serves also as a guide and connector for a shiftable roof section, and also has a means whereby a perch can be supported adjacent to the door or inlet to the house.

Another object is to supply a bird house with a door so located as to be protected by the roof section against the admission of rain and wind.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a top plan view of the bird house, a portion of the roof being broken away.

Figure 2 is a view partly in side elevation and partly in section, one of the positions of the roof, when lifted out of normal position, being indicated by broken lines.

Figure 3 is a fragmentary view, partly in section, showing the perch and door opening.

Referring to the figures by characters of reference, 1 designates the body portion of the bird house which, in the structure illustrated, has the contour and proportions of a flower pot and it can be formed of any suitable ceramic material or of plastic or the like capable of being easily molded and hardened. The open upper end of this body portion is formed with an integral annular collar 2 and, at a selected point, a portion of the collar is removed to provide a door opening or an inlet 3 extending from the top edge of the body downwardly a desired distance.

A supporting yoke formed preferably of heavy wire, has been indicated at 4. This yoke is provided at its center with an eye 5 for the purpose of engaging a suitable support. The sides 6 of the yoke are parallel to constitute guides and the lower ends of these sides have inturned fingers 7 extending into diametrically opposed openings 8 formed within the body portion 1 below and close to the collar 2.

Extending upwardly from the edge of the body portion 1 are spacing elements 9 which can be formed on or applied to the body portion. In the structure illustrated these spacing elements are in the form of heavy wire clips straddling and fitted snugly upon the edge portion of the body. These protuberances serve normally to support the roof 10 of the bird house which, in the structure illustrated, has the general appearance of an inverted saucer such as used frequently in connection with flower pots. This roof, which has a flat top, is formed with widely spaced openings 11 through which the guides 6 extend.

The diameter of the roof is greater than the diameter of the top of the body portion 1 and in the structure shown this top includes as an integral part thereof a tapered flange 12 extending therearound and depending therefrom. This flange, which is tapered upwardly, extends to the level of the door opening 3 but is spaced therefrom a sufficient distance to permit birds to enter and leave the opening freely but at the same time constitutes a protecting shield for preventing the admission of rain and wind through the opening.

A stiff wire 13 is provided at its upper end with a hook 14 which straddles the bottom edge of the door opening 3 and the lower end of this wire, which is outside the body portion 1, has an arm 15 extended outwardly therefrom. This arm carries a perch in the form of a stick of wood 16 having a longitudinal bore 17 into which the arm 15 extends. Thus the perch is located below the overhanging portion of the roof.

In practice the yoke 4 is suspended from a suitable support and the roof 10, which preferably is formed of a ceramic material, normally rests on the spacing elements 9. The bird house is thus ready for use and obviously, because of its construction and the material of which it is formed, will provide a cool attractive shelter fully protected from the elements. As the top of the roof is flat, it provides a surface on which the birds can alight.

When it is desired to clean the bird house, the roof is slid upwardly along the guides 6 and the body portion 1 can then be swung on the fingers 7 so that access is thus given to the interior of the body portion which thus can be easily emptied and sterilized. As before stated the entire structure with the exception of the wire and perch can be formed of molded material of any kind capable of withstanding the action of moisture and temperature changes but in practice it has been found advantageous to produce the parts from pottery which can be glazed or unglazed as preferred. Thus increased protection against heat and cold is afforded.

What is claimed is:

1. A bird house including a body portion having an open upper end formed with an integral annular collar a portion of which is cut away to provide an inlet opening for birds when the open upper end is covered, a supporting yoke detachably connected to the body portion comprising a length of heavy wire of inverted U shape and including parallel sides providing guides, the lower ends of said sides being formed with inturned opposed fingers, the yoke having at its center a support engaging eye, the body portion having diametrically opposed openings below and close to the collar for the reception of said fingers, spacing elements in the form of heavy wire clips straddling and fitted snugly upon the collar, a flat circular roof of inverted saucer-like formation and substantially greater in diameter than the diameter of the top of the body portion slidably and removably mounted on the guides and supported on said elements a distance sufficiently close to the fingers to constitute a positive means for preventing withdrawal of the fingers from said diametrically opposed openings, the roof having widely spaced openings in its flat surfaced portion through which the guides extend, and a wide depending upwardly tapering peripheral flange integral with the roof and proportioned in width to bring its outer edge to a level substantially even with the bottommost part of said inlet opening.

2. A hanging bird house comprising a body portion having an open upper end partially cut away to provide an inlet opening for birds and having near said upper end diametrically opposed apertures, a supporting yoke for said body portion comprising a length of heavy wire of inverted U shape and including parallel sides and inturned fingers at the lower ends of the sides removably inserted in the apertures, and a roof of substantially greater diameter than the diameter of the body portion slidably mounted upon said sides and resting upon the upper end of the body portion, said roof having wide spaced diametrically opposed openings through which said sides extend, the distance between said roof openings and finger receiving apertures being sufficiently close to prevent withdrawal of the fingers from the apertures.

SAMUEL M. SMITH.

REFERENCES CITED

The following references are of record in the file of this patent:

UNITED STATES PATENTS

| Number | Name | Date |
|---|---|---|
| D. 117,053 | Straus | Oct. 10, 1939 |
| 88,799 | Murdock | Apr. 13, 1869 |
| 552,644 | Matthews | Jan. 7, 1896 |
| 1,410,632 | Welch | Mar. 28, 1922 |
| 1,894,406 | Lenhart | Jan. 17, 1933 |

FOREIGN PATENTS

| Number | Country | Date |
|---|---|---|
| 299,600 | Great Britain | Nov. 1, 1928 |
| 503,852 | Germany | July 17, 1930 |